(12) United States Patent
Yamamoto et al.

(10) Patent No.: US 7,810,039 B2
(45) Date of Patent: Oct. 5, 2010

(54) IMAGE DISPLAYING METHOD, IMAGE DISPLAYING PROGRAM, AND DISPLAY

(75) Inventors: Takashi Yamamoto, Yamato (JP); Tomoyuki Ohno, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 11/073,692

(22) Filed: Mar. 8, 2005

(65) Prior Publication Data

US 2005/0223333 A1    Oct. 6, 2005

(30) Foreign Application Priority Data

| Mar. 31, 2004 | (JP) | ............................. 2004-106273 |
| Feb. 24, 2005 | (JP) | ............................. 2005-048840 |

(51) Int. Cl.
*G06F 3/00* (2006.01)

(52) U.S. Cl. ........................ 715/765; 715/243; 715/839

(58) Field of Classification Search ................. 715/517, 715/764, 765; 348/211.99, 211.8, 564, 565, 348/569, 239, 135
See application file for complete search history.

(56) References Cited

U.S. PATENT DOCUMENTS

| 6,351,291 | B1 * | 2/2002 | Asano ........................ 348/564 |
| 7,030,932 | B2 * | 4/2006 | Han ............................ 348/554 |
| 7,061,525 | B1 * | 6/2006 | Tanaka et al. ............. 348/211.8 |
| 7,312,766 | B1 * | 12/2007 | Edwards ........................ 345/8 |
| 2002/0047910 | A1 * | 4/2002 | Tariki ........................ 348/239 |
| 2002/0126208 | A1 * | 9/2002 | Misue et al. ................ 348/211 |
| 2004/0105012 | A1 * | 6/2004 | Lee .......................... 348/220.1 |
| 2004/0119836 | A1 * | 6/2004 | Kitaguchi et al. ....... 348/207.99 |
| 2004/0218099 | A1 * | 11/2004 | Washington ................ 348/571 |
| 2006/0133787 | A1 * | 6/2006 | Ike et al. ....................... 396/56 |

FOREIGN PATENT DOCUMENTS

| JP | 7-184032 | 7/1995 |
| JP | 10-51576 | 2/1998 |
| JP | 2003-51981 | 2/2003 |

OTHER PUBLICATIONS

Red Hen Systems, MediaMapper.com, Jan. 24, 2002, pp. 1-12.*

* cited by examiner

*Primary Examiner*—William L Bashore
*Assistant Examiner*—Daeho D Song
(74) *Attorney, Agent, or Firm*—Fitzpatrick, Cella, Harper & Scinto

(57) ABSTRACT

An image displaying method of displaying an image selected from images stored in an image storing apparatus onto a display has the step of displaying the image selected from the images stored in the image storing apparatus into a partial area on the display based on a relative positional relation between the image storing apparatus and the display.

3 Claims, 12 Drawing Sheets

IMAGE DISPLAYING METHOD, IMAGE DISPLAYING PROGRAM, AND DISPLAY

BACKGROUND OF THE INVENTION

1. Field of the Invention

The invention relates to an image displaying method of arranging a plurality of images on a display, a program for executing the image displaying method, and a display which is used for displaying the images.

2. Related Background Art

Various methods of arranging a plurality of images photographed by a digital camera in a desired layout have been proposed. For example, a method whereby a layout according to the number of images to be displayed is selected from prepared layouts and image data, character data, and figure data are inserted and arranged has been disclosed in Japanese Patent Application Laid-Open No. H07-184032. Another method whereby a sheet describing a pattern which designates a layout and a sheet to designate image data to be arranged are read, thereby designating the layout, has also been disclosed in Japanese Patent Application Laid-Open No. H10-051576. However, according to those proposed methods, the layouts have been predetermined and the images cannot be freely arranged. Therefore, for example, in a layout including an overlap of the images, there is a case where important areas are overlapped depending on contents of the images to be displayed. There is, consequently, a case where those methods are not proper, with the important areas hidden or the like. In the case where the user enjoys conversation according to the image contents while displaying such images onto a TV apparatus disposed in a living room or the like, there is needed a more interactive image layout in line with the image contents or the conversation that is taking place.

According to many user operating techniques regarding a figure layout for a personal computer, in the case of freely arranging image data, the operation to select the image and the operation to arrange the selected image are necessary. FIG. 12 is a diagram showing an example of a display for such operations. In the diagram, reference numeral 900 denotes a display of an application for freely arranging the image data and displaying; 901 an icon display section in which icons 902 of images serving as a plurality of candidates are displayed in order to select the image to be displayed; 903 a plurality of display images arranged on a display screen; and 904 a cursor indicator showing an operation target among the display images 903 or the icons 902.

When the user intends to select one of the images displayed in the icon display section 901 and arrange it in an arbitrary position on the display 900, first, in an icon selecting mode, he shifts a cursor to the icon display section 901 and moves the cursor onto the icon 902 of the image to be displayed among the icons 902. Subsequently, the deciding operation to select the icon 902 is executed, the operation mode is shifted to an icon moving mode, thereafter, the icon 902 with the cursor indicator 904 is moved to the arbitrary position, the layout deciding operation is executed, and a display state is decided. That is, the operation to move the cursor for two operations such as operation to select the image to be displayed and operation to decide the display position are, respectively, necessary.

Such an operating method can be relatively easily executed in the case of using an operating device such as a mouse pointer or executing the operation such as a pen-input which can directly designate an arbitrary position on a display screen and directly move the cursor as an operation target to the designated position.

In the case of a television receiver or an AV apparatus which is used in a living room at home, however, the apparatus is not in an environment with a space to operate the mouse pointer, pen input device, or the like in front of the display screen. Therefore, such operations are generally executed by operating a remote controller device which is held by a hand and operated with buttons.

If the user tries to execute the foregoing cursor moving operation by direction buttons provided on the remote controller, for example, in the case where the cursor indicator 904 shown in FIG. 12 is moved in the icon display section 901, it is moved by the distance corresponding to one icon by the single button operation. Therefore, many cursor moving operations are needed to select the icon 902 existing at a remote position in the icon display section 901. When the cursor is moved to an arbitrary position in the display 900, the button operation is necessary every moving step. Therefore, the operation to move the cursor to the remote position is troublesome and it is difficult to construct a preferable operating system in any of the above-mentioned cases.

As another known technique regarding the foregoing technique, there is one disclosed in Japanese Patent Application Laid-Open No. 2003-051981.

SUMMARY OF THE INVENTION

It is an object of the invention to improve the operability of the operation for arranging images onto a display.

According to the first invention, there is provided an image displaying method of displaying an image selected from images stored in an image storing apparatus onto a display, comprising the step of displaying the image selected from the images stored in the image storing apparatus into a partial area on the display based on a relative positional relation between the image storing apparatus and the display.

According to the second invention, there is provided a display having an image display unit, comprising: a position information input unit for inputting position information of an image storing apparatus; and a display controller for displaying an image based on image data stored in the image storing apparatus into a partial area on the image display unit which has been determined on the basis of the position information in the image storing apparatus inputted by the position information input unit.

DETAILED DESCRIPTION OF THE PREFERRED EMBODIMENTS

A best mode for carrying out the invention will be specifically described in detail hereinbelow on the basis of embodiments with reference to the drawings. However, as for dimensions, materials, shapes, relative layouts, and the like of component elements disclosed in the embodiments, the scope of the invention is not limited only to them unless otherwise specified.

Embodiment 1

An image displaying method according to the embodiment 1 of the invention will be described with reference to FIGS. 1 to 5A through 5G.

In the embodiment, the case of using an image displaying system constructed by a digital camera and a digital television having a function of visualizing image data photographed by the digital camera and viewing an obtained visual image will now be described as an example.

Figure 1:
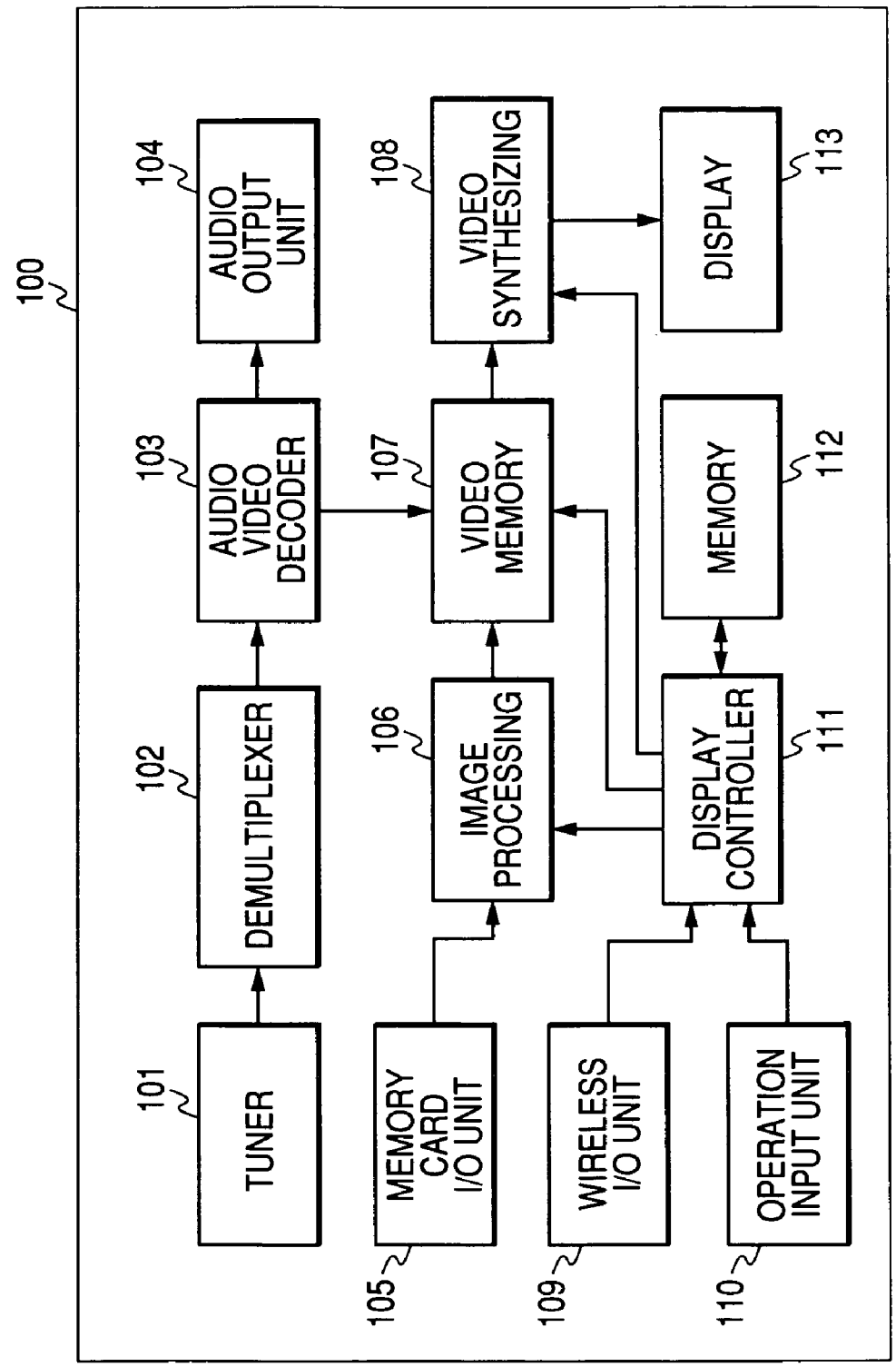
FIG. 1 is a block constructional diagram of a digital television which is used in an image displaying method according to the embodiment 1 of the invention.

FIG. 1 is a block constructional diagram of the digital television which is used in the image displaying method according to the embodiment 1 of the invention. In the diagram, reference numeral 101 denotes a tuner. A broadcast signal from a receiving antenna (not shown) of a digital broadcast and a broadcast signal of a CATV are inputted to the tuner 101. The tuner 101 selects a predetermined transmission channel from the reception signal on the basis of control of a display controller 111, which will be explained hereinafter, executes demodulation, error correction, and the like to reception data in the received transmission channel, and outputs a transport stream (TS) signal. Reference numeral 102 denotes a demultiplexer. The demultiplexer 102 extracts program layout information from the TS signal, outputs it to the display controller 111, which will be explained hereinafter, and separates target video signal, audio signal, and digital broadcasted data from the TS signal in accordance with the control of the display controller 111. The audio signal is decoded by an audio video decoder 103 and outputted as an audio sound from an audio output unit 104 including a D/A converter. The video signal is decoded by the audio video decoder 103, temporarily written into a video memory 107, and thereafter, displayed onto a display 113 through a video synthesizing unit 108. As a device constructing the display 113, for example, there are a flat display panel having a matrix electrode structure such as a liquid crystal display or a plasma display, a CRT (cathode ray tube), or the like. The separated digital broadcasted signal is stored into a memory 112 and it is read out and outputted to the display controller 111 when the user views the digital broadcast.

Reference numeral 110 denotes an operation input unit. The operation input unit 110 includes a receiving unit of a remote controller using an infrared signal and operation switches which are directly provided for a digital television 100, inputs the operation of the user, and sends it to the display controller 111. The operation input of the user which is received from the operation input unit 110, the program layout information which is received from the demultiplexer 102, or the digital broadcasted data read out from the memory 112 is inputted to the display controller 111 and the display controller 111 makes the following control. That is, on the basis of those input data, the display controller 111 writes graphic data to be presented to the user into the video memory 107. The video signal from the audio video decoder 103 and a still image signal photographed by the digital camera, which will be explained hereinafter, are properly synthesized by the video synthesizing unit 108 and displayed onto the display 113. The digital television 100 receives the digital broadcast on the basis of the operation of the user by the integrated control operation of the display controller 111 in the foregoing component elements, thereby enabling the user to view a target broadcast program.

In the digital television 100, reference numeral 105 denotes a memory card I/O unit. By connecting the memory card I/O unit 105 to a detachable memory card in which image data photographed by a digital camera 200, which will be explained hereinafter, has been stored, the memory card I/O unit 105 inputs and outputs image data including the photographed image data and additional information. The memory card I/O unit 105 stores the read data as an image file into the memory 112. The display controller 111 outputs a display serving as a graphical user interface to the video memory on the basis of a program which has previously been stored and allows it to be displayed on the display 113. Further, in accordance with the user operation which is inputted through the operation input unit 110, the display controller 111 reads out the image data obtained from the memory card or the image file stored in the memory 112 and sends it to an image processing unit 106. In the image processing unit 106, the image data is decoded and synthesized with graphic data for operation in the video synthesizing unit 108 through the video memory 107. The synthesized image is displayed onto the display 113.

Reference numeral 109 denotes a wireless I/O (input/output) unit. The wireless I/O unit 109 communicates with a wireless I/O unit 208 of the digital camera 200, which will be explained hereinafter, and transmits the control data and the image file. That is, the wireless I/O unit 109 has a function of a position information input unit for inputting position information of the digital camera 200, which will be explained hereinafter. The received photographed image file data of the digital camera is stored as an image file into the memory 112 in a manner similar to the image data inputted from the memory card I/O unit 105. The image based on the received photographed image file data of the digital camera is displayed onto the display 113 through the image processing unit 106. As means for wireless communication, a wireless LAN according to IEEE802.11b, a short range wireless method according to Bluetooth (registered trademark), or the like is used.

In the digital television 100, by the integrated control operation of the display controller 111 in the foregoing component elements, the image photographed by the digital camera 200 can be viewed on the basis of the operation of the user.

Figure 2:
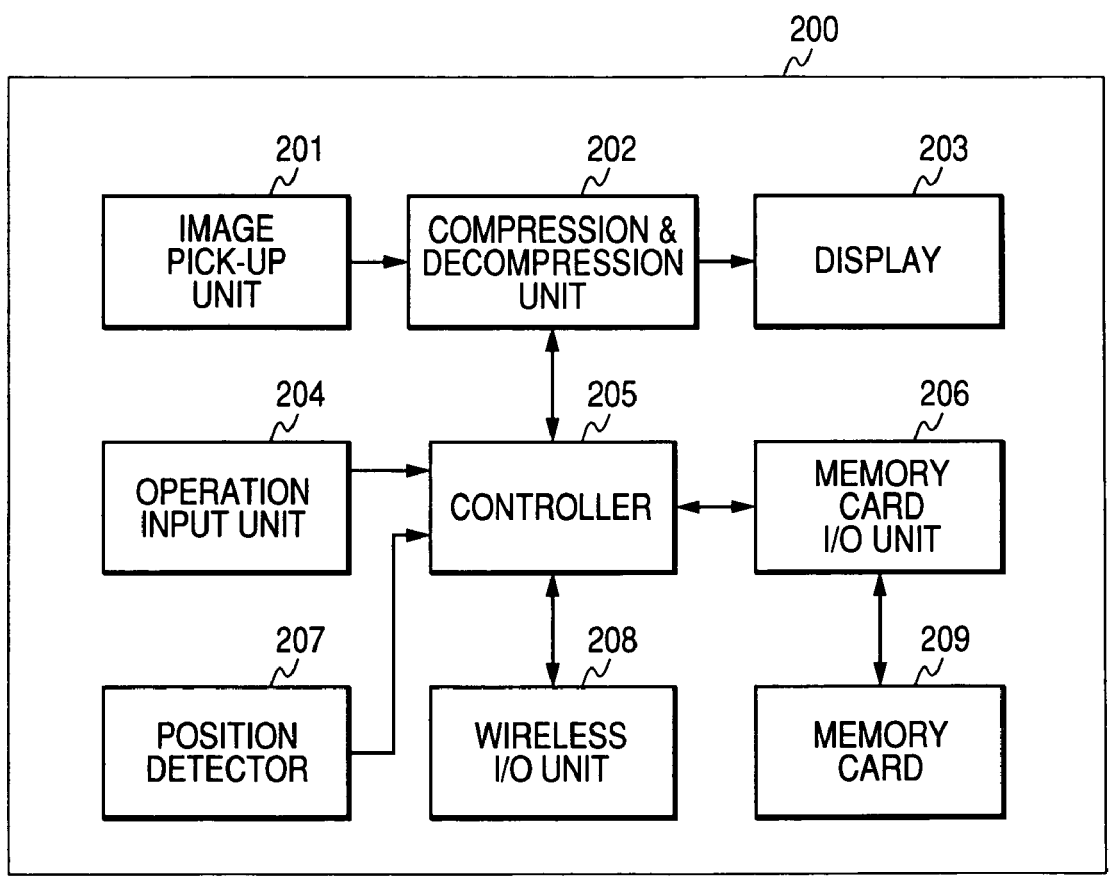
FIG. 2 is a block constructional diagram of a digital camera which is used in the image displaying method according to the embodiment 1 of the invention.

FIG. 2 is a block constructional diagram of the digital camera which is used in the image displaying method according to the embodiment 1 of the invention. In the diagram, reference numeral 201 denotes an image pick-up unit of the digital camera which includes an optical system such as a len, diaphragm, or the like, an image pick-up device, a device driving circuit, and the like, electronically photographs an image, and outputs non-compression image data. Reference numeral 202 denotes a compression and decompression unit for compressing the non-compression image data, decompressing the compression image data read out of a recording media through a memory card I/O unit 206, and outputting an image data signal to be displayed onto a display 203. Reference numeral 206 denotes the memory card I/O unit 206. The memory card I/O unit 206 constructs an image file by adding necessary additional data to the compressed image data and stores it into a memory card 209 as a recording media. The memory card I/O unit 206 reads out the image file from the recording media and extracts the compression image data to be displayed on the display 203 or necessary information. The display 203 is constructed by, for example, a liquid crystal display (LCD). In place of the liquid crystal display, an organic EL display or another flat panel display can be also used.

Reference numeral 208 denotes the wireless I/O unit. The wireless I/O unit 208 communicates with the wireless I/O unit 109 of the digital television 100 and transmits the image data and the control information. The image data is read out by a controller 205 from the image file which has been photographed by the digital camera 200 and stored in the memory card 209 and is supplied to the wireless I/O unit 208. The control data is data which is formed by the controller 205 on the basis of the information which is outputted from an operation input unit 204 and a position detector 207. The wireless LAN according to IEEE802.11b, the short range wireless method according to Bluetooth (registered trademark), or the like is used as means for wireless communication as already mentioned in the wireless I/O unit 109 of the digital television.

Reference numeral 207 denotes the position detector. The position detector 207 inputs the operation to the digital camera 200 when the user moves the main body of the digital camera 200 in the up/down directions, right/left directions, or front/rear directions or inclines it. In the embodiment, an XYZ-triaxial acceleration sensor is used for the position detector and the moving direction, a movement amount per time, and an angle of rotation are outputted in accordance with an output signal of the acceleration sensor.

Reference numeral 204 denotes the operation input unit including a shutter button serving as a trigger for photographing, direction/decision buttons for selecting and deciding a display image. The operation input unit 204 is used to input the operation to the digital camera 200 of the user.

Figure 3:
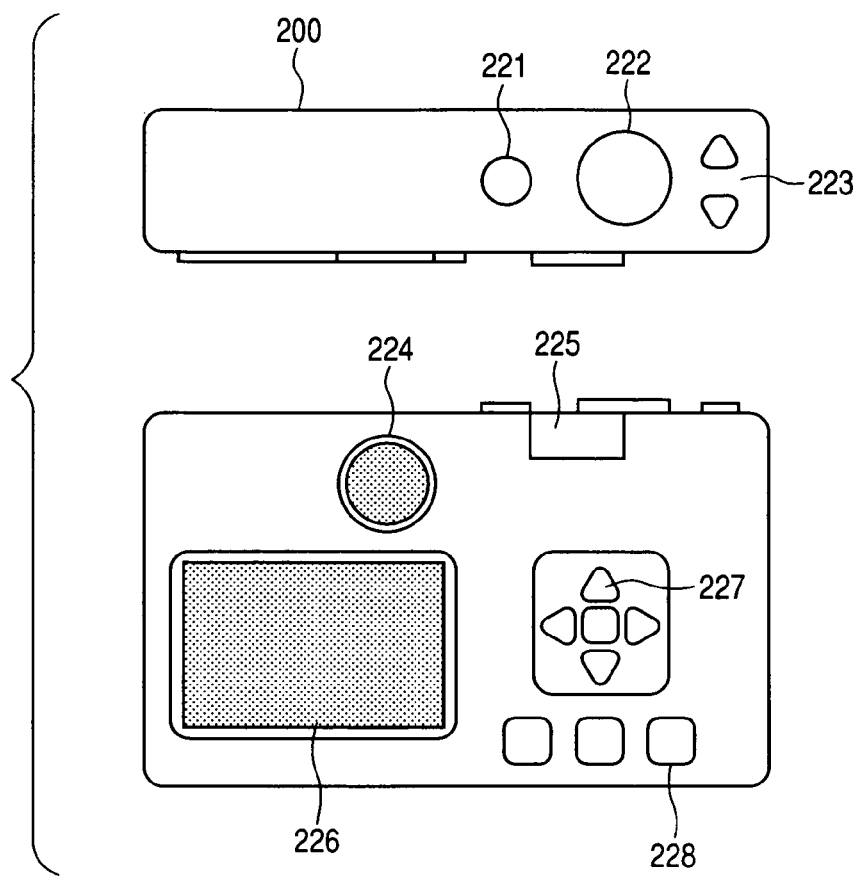
FIG. 3 is an external view of the digital camera according to the embodiment 1 of the invention.

FIG. 3 is an external view of the digital camera according to the embodiment 1 of the invention. In FIG. 3, an external view (upper diagram) seen from the top and an external view (lower diagram) seen from the back surface are illustrated. These diagrams are shown to explain elements such as buttons and the like constructing the operation input unit 204 described with reference to FIG. 2. In FIG. 3, reference numeral 221 denotes a power button. By operating the power button 221, a power source of the digital camera 200 is turned on or off. Reference numeral 222 denotes a shutter button. By completely pressing the shutter button 222, the trigger operation is given to the image pick-up operation upon photographing. By pressing the shutter button 222 to the half position, the focusing operation for photographing is started and the display regarding the photographing conditions is started just before photographing. Reference numeral 223 denotes zoom buttons. By pressing the zoom buttons, the zooming operation upon photographing is executed. The zoom buttons 223 are used to enlarge or reduce a display image when the photographed image is viewed. Reference numeral 224 denotes a finder to confirm a photographing range through the lens of the image pick-up unit (not shown). Reference numeral 225 denotes a switch to change over the operation mode of the digital camera 200. By pressing the switch 225, it is possible to select one of a photographing mode to photograph the image by the image pick-up unit 201, a reproducing mode to display the photographed image stored in the memory card 209 onto a liquid crystal monitor 226 and view it, and a television viewing mode to display the photographed image stored in the memory card 209 onto the display 113 of the digital television 100 and view it. Reference numeral 227 denotes direction/decision buttons to execute the operation for moving a focal point on the graphic data regarding the operation which is displayed on the display 203, selecting an operation item, and deciding it. Reference numeral 226 denotes the liquid crystal monitor constructing the display 203 and 228 indicates other operation buttons.

In FIG. 2, reference numeral 205 denotes the controller for organically controlling the component elements of the digital camera 200 described above and providing functions of the digital camera to the user. The controller 205 allows the display 203 to display graphic elements for allowing the user to set the digital camera 200 into a state suitable for the target photographing and controls operating conditions of each unit of the digital camera 200 on the basis of the user operation which is inputted through the operation input unit 204. When the digital camera 200 is set to the photographing mode, the input state of the image to the image pick-up unit 201 directed toward an object is successively displayed on the display 203 through the compression and decompression unit 202. Therefore, the display 203 functions as a finder. When the user presses the shutter button of the operation input unit 204 at the moment when he determines that the target photographing conditions are satisfied, the controller 205 controls the light emission of stroboscopic means (not shown) in accordance with the settings and allows the compression and decompression unit 202 to compress the image data photographed by the image pick-up unit 201 at that timing. The controller 205 further obtains present time/date data from a calendar clock (not shown) and constructs an image file as additional information together with the information of the digital camera and information regarding the photographing conditions. The controller 205 stores the image file into the memory card 209 through the memory card I/O unit 206.

When the digital camera 200 is set to the reproducing mode, the controller 205 reads out the photographed image data from the image data stored in the memory card 209 through the memory card I/O unit 206 and allows the display 203 to display it through the compression and decompression unit 202. The images as display targets are sequentially changed by operating the right/left direction buttons in the operation input unit 204. The image which is displayed is enlarged or reduced by operating the zoom buttons in the operation input unit 204. In the enlargement display state, a display area in the image data can be moved by operating the up/down and right/left direction buttons in the operation input unit 204.

When the digital camera 200 is in the television viewing mode, the photographed image can be displayed on the display 113 of the digital television 100 of the present system and viewed by the operation of the controller 205 or by operating in association with the display controller 111 of the digital television 100.

Figure 4:
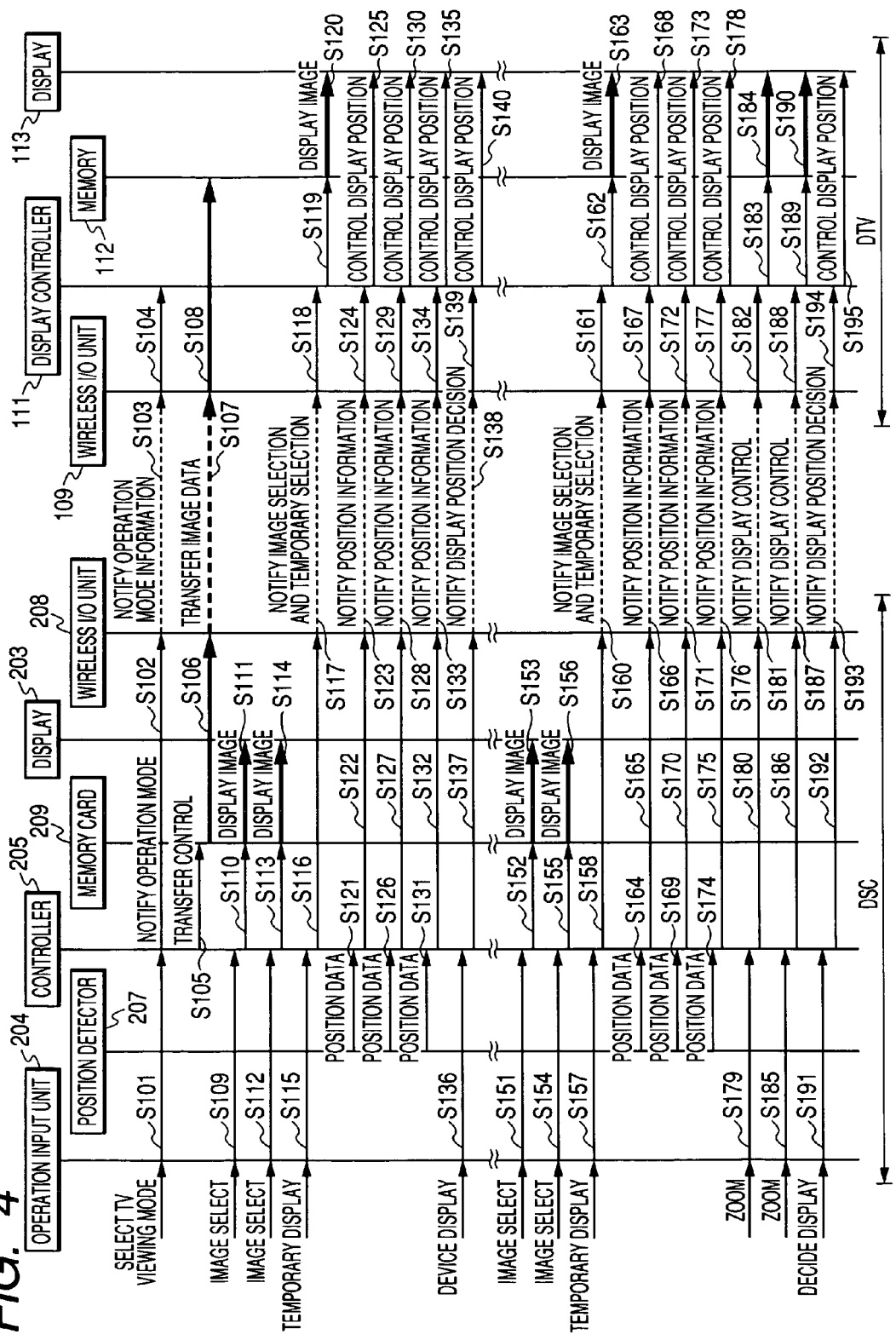
FIG. 4 is a flowchart showing a procedure of the image displaying method according to the embodiment 1 of the invention.

FIG. 4 is a flowchart showing a procedure of the image displaying method according to the embodiment 1 of the invention. In this flowchart, the operation of the digital camera 200 and the digital television 100 in the television viewing mode will be explained mainly with respect to the flow of the control data and the image data.

The television viewing mode is started when the user executes the operation to switch the operating mode of the digital camera 200 (step S101). The controller 205 which detected the switching operation of the operating mode switch 225 sends an operating mode information notification showing that the operating mode has been set to the television viewing mode to the display controller 111 of the digital television 100 through the wireless I/O unit 208 of the digital camera 200 and the wireless I/O unit 109 of the digital television 100 (S102 to S104). Subsequently, the controller 205 of the digital camera 200 makes control so that the image data stored in the memory card 209 and serving as a display target is transmitted to the digital television 100 (S105). The image data is transferred to the memory 112 of the digital television 100 from the memory card 209 in a wireless manner and stored (S106 to S108).

The user who has set the operating mode to the television viewing mode selects the image to be displayed onto the digital television 100 and viewed by using the liquid crystal monitor of the digital television 100. That is, when the user operates the right/left direction buttons 227 of the digital camera 200, outputs (S109, S112) of the operation input unit 204 are detected by the controller 205. The controller 205 reads out the target image data from the memory card and makes control so that it is displayed on the display 203 (S110, S113; S111, S114).

When the user finds the image to be displayed, he directs the digital camera 200 toward the digital television 100 and presses the shutter button 222 to the half position. The output of the operation input unit 204 as a temporary displaying operation is detected by the controller 205 (S115). In a wireless manner, the display controller 111 of the digital television 100 is notified of information which designates the selected image and information showing that the temporary selecting operation has been executed (S116 to S118). The display controller 111 reads out the image data of the designated image from the memory 112 and makes control so that it is displayed on the display 113 through the image processing unit 106 (S119, S120). The operation in which the image is displayed on the display 113 denotes the operation in which the image is displayed in a partial area on the display 113, in other words, the operation in which the image is displayed in a partial area in an outer periphery of the display area of the display 113.

The user moves the main body of the digital camera 200 in the up/down and right/left directions or inclines it in the state where the target image has been displayed on the display 113 of the digital television 100, so that he can adjust the display position such as coordinates, inclination, or the like of the image displayed on the display 113. That is, the display controller 111 of the digital television 100 is notified of position information such as coordinate information, inclination information, and the like from the controller 205 in a wireless manner on the basis of the movement amount and inclination of the digital camera 200 which are detected by the position detector 207 of the digital camera main body (S121 to S124). On the basis of the notified position information, the display controller 111 controls the video memory 107 and the video synthesizing unit 108 and controls the display position of the image data which is displayed on the display 113 (S125). The notification of the position information is repetitively performed for every detection of the movement of the digital camera 200 or for every predetermined time interval (S126 to S130 and S131 to S135). The user can move the image to a desired display position on the display 113.

By fully depressing the shutter button 222 which has been operated to the half-depressing position by the user, the user can decide the display position of the image displayed on the display 113. That is, when the controller 205 detects the full-depression of the shutter button 222 (S136), a display position decision notification is sent to the display controller 111 of the digital television 100 in a wireless manner (S137 to S139). On the basis of this notification, the display controller 111 controls the video memory 107 and the video synthesizing unit 108 and decides the display position of the image data which is displayed on the display 113 (S140).

According to the operation described above, the image selected from images stored in the digital camera can be displayed on the partial area on the display based on relative positions of the digital camera and the display. It is to be noted that displaying the relative positions is performed such that, in relation to the position of one, relative position and state or orientation of the other is shown. Accordingly, an information of the relative positions includes not only coordinate information of the one (camera) the other (display), but also an information as to whether a distance between the one and the other is shorter or longer.

Figure 5A:
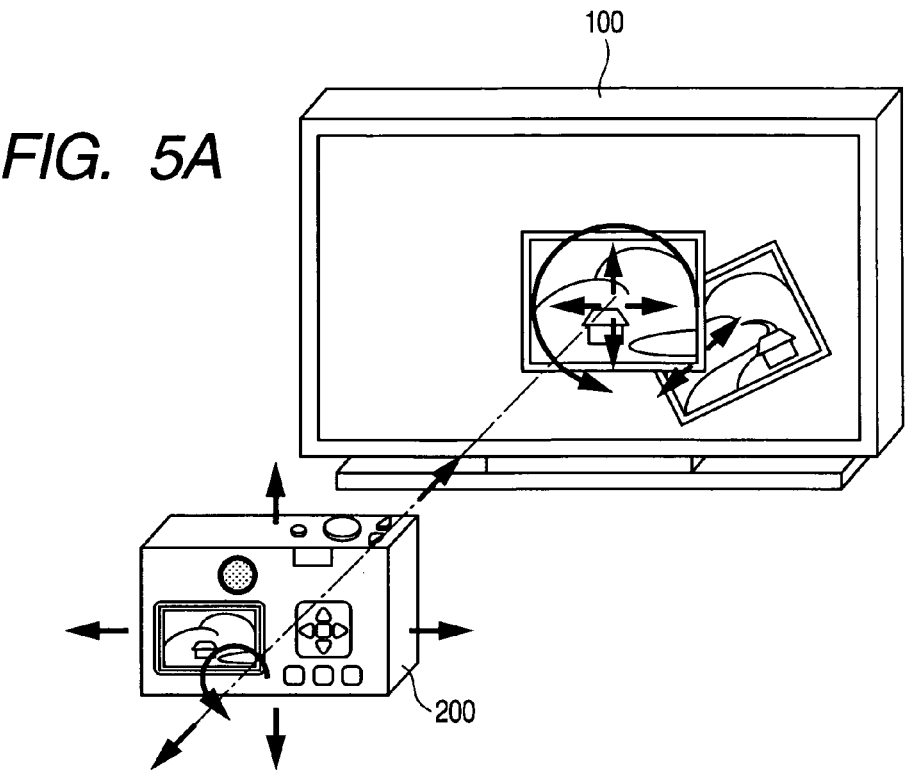
FIGS. 5A, 5B, 5C, 5D, 5E, 5F and 5G are explanatory diagrams of a specific procedure of the image displaying method according to the embodiment 1 of the invention.
Figure 5B:
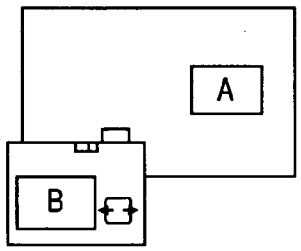
Figure 5C:
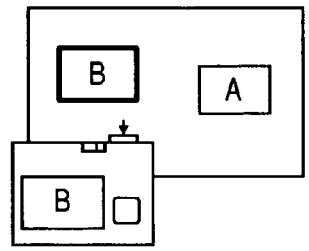
Figure 5D:
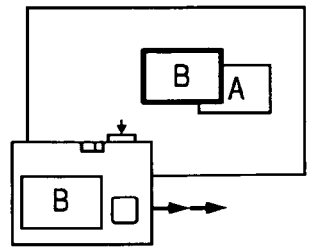
Figure 5E:
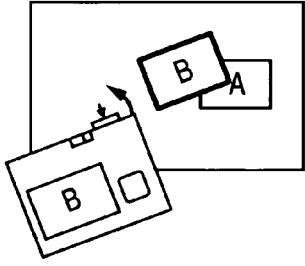
Figure 5F:
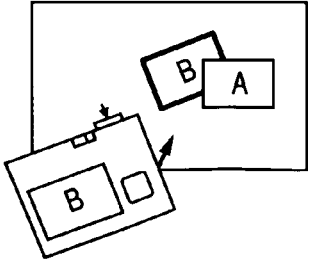
Figure 5G:
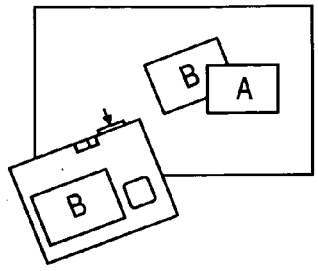

FIGS. 5A to 5G are explanatory diagrams of a specific procedure of the image displaying method according to the embodiment 1 of the invention. That is, FIGS. 5A to 5G are the diagrams for explaining the movement of the digital camera main body and the change in the display position of the image on the display 113 mentioned above. FIG. 5A is the diagram showing a positional relation between the digital television 100 and the digital camera 200. This diagram shows that when the digital camera 200 is moved in the up/down and right/left directions or in the rotating direction at the position where it faces the display screen of the digital television 100, the display position of the image displayed on the display 113 of the digital television 100 is also moved in the same direction. The image serving as a display target can be selected on the liquid crystal monitor by the right/left buttons of the digital camera 200 (FIG. 5B). By half-depressing the shutter button 222, the selected image (image B in the diagram) can be displayed on the display 113 of the digital television 100 (FIG. 5C). The display position of the selected image can be moved by moving the digital camera 200 (FIG. 5D). The displaying direction can be rotated by rotating the digital camera 200 (FIG. 5E). By executing the operation for moving forward the digital camera 200 to approach the digital television 100, an overlap relation with another image can be set in-such in a state where the selected image B is partially hidden behind the image (image A in the diagram) displayed on the digital television 100 (FIG. 5F). That is, either the image A or B (to be displayed) can be selected in the overlapped area portion. Further, the display state can be decided by fully depressing the shutter button (FIG. 5G). In FIGS. 5A to 5G, as for the selected image (image B in the diagram) serving as a target of the position adjustment, a periphery of the displayed image is displayed in a color, thereby showing that such an image is the operation target. Such a focusing display is finished at a point of time when the display state is decided (FIG. 5G). Although the operation to change the overlap relation with another image (image A in the diagram) to the lower state has been shown in FIGS. 5A to 5G, it can be also changed so that the selected image B is overlapped on the image A by a larger area by executing the operation for allowing the digital camera 200 to be far from the digital television 100.

Returning to FIG. 4, the operation in the case where the image which has already been displayed on the digital television 100 is selected in the digital camera 200 will be described. In FIG. 4, the image is selected on the liquid crystal monitor of the digital camera by the operation input of the user (S151 to S157). The display controller 111 of the digital television 100 is notified of the designation information of the selected image and the temporary selecting operation by the controller 205 in a wireless manner. At this time, if the designated image is the image which has already been displayed onto the display 113 of the digital television 100, the display controller 111 sets the image which has already been displayed to the target of the display position control (S161 to S163). On the basis of the position information of the digital camera 200 which is notified after that, the decided position of the designated image is moved and the image is displayed there (S164 to S178).

In the temporary selection display state where the display position of the image is moved in accordance with the position of the digital camera 200, when the user operates the zoom buttons 223 of the digital camera 200, the controller 205 which detected the output (S179) of the operation input unit 204 sends the zooming operation as display control information to the display controller 111 of the digital television in a wireless manner (S180 to S182). The display controller 111 forms an enlarged or reduced image of the image to be displayed through the image processing unit 106 and allows the enlarged or reduced image to be displayed on the display 113 through the video memory 107 and the video synthesizing unit 108 (S183, S184). At this time, the controller 205 of the digital camera 200 allows the similar enlarged or reduced image to be also displayed on the liquid crystal monitor.

When the user operates the direction buttons 227 during the enlarging/reducing operation, the display controller 111 is notified of the display control information by a similar path (S185 to S188). In the display controller 111, the center position of the enlarging/reducing display is adjusted and the display area in the image to be displayed on the display 113 is changed (S189, S190). As already been described, by the user's operation for fully depressing the shutter button 222 of the digital camera 200 by, such a display state is determined and the display state on the display 113 of the digital television 100 is fixed (S191 to S195).

As described above, the system of the embodiment has: the step wherein the image as a display target in the digital camera in which a plurality of photographed images have been stored is selected and, of the display of the digital television for displaying the images, the selected image is displayed in the position corresponding to the relative position between the digital camera and the digital television; and the step wherein another image selected on the digital camera is further displayed in another relative position between the digital camera and the digital television. Thus, the operation to select the image as a display target on the display screen of the digital television is unnecessary. Therefore, a layout of a plurality of images can be realized by the simple operation even in an operation environment where there is no plane space such as a desk or the like set in a living room and the input device such as mouse, pen input, or the like which can directly designate the position in the plane cannot be used.

By directly moving the digital camera main body in which the image data has been selected and displayed on the liquid crystal monitor, the image position on the display of the digital television can be moved. Therefore, it is possible to execute the operation as if the target photograph card were moved to the top from a bundle of a plurality of photograph cards held in the palm of the user's hand and the bundle of photograph cards could be directly moved and put in the desired display position. In this manner, the inspirational operation according to actual simulation which can be easily understood can be executed.

The embodiment has been described above on the assumption that the image data stored in the memory card of the digital camera is transferred in a lump at the start of the operation and only the selection information is notified upon selection of the image on the digital camera. Such a construction is used to reduce a time which is necessary until the image is displayed on the digital television after the selection of the image. However, if the digital camera has enough performance to transfer the image data, a construction in which the image data is transferred each time the image is selected by the user operation can be also used.

As a method of transferring the image data in a lump, a removable media such as a memory card or the like in which a plurality of image data serving as display targets have been stored can be moved and connected from the digital camera to the digital television at the start of the operation or can be previously moved and connected before it. When the image data is transferred in a lump in a wireless manner, it is also possible to use a method whereby at a point of time when the digital camera and the digital television recognize each other in a wireless manner, the image data is previously transferred and stored into a memory of the digital television before the operating mode is set to the television viewing mode.

A method of using infrared rays can be also used for the wireless communication. However, since it takes time to transfer the image data, if such a method is used together with means for preliminarily transferring the image data, means for preliminarily moving the image data by a memory card, or the like, it is more effective. Even in the case of the communication using the wired connection, the essence of the present invention is not lost so long as it is within a range where the movement of the digital camera is not obstructed.

Embodiment 2

An image displaying method according to the embodiment 2 of the invention will now be described with reference to FIGS. 6 to 11A through 11G.

The embodiment will be explained with respect to an example in the case of using a system in which the digital camera and the digital video camera are connected, the digital televisions each having a function for visualizing the photographed image of the digital camera and allowing the user to view it are connected by a network, and the viewing of the photographed image of the digital camera is shared.

Figure 6:
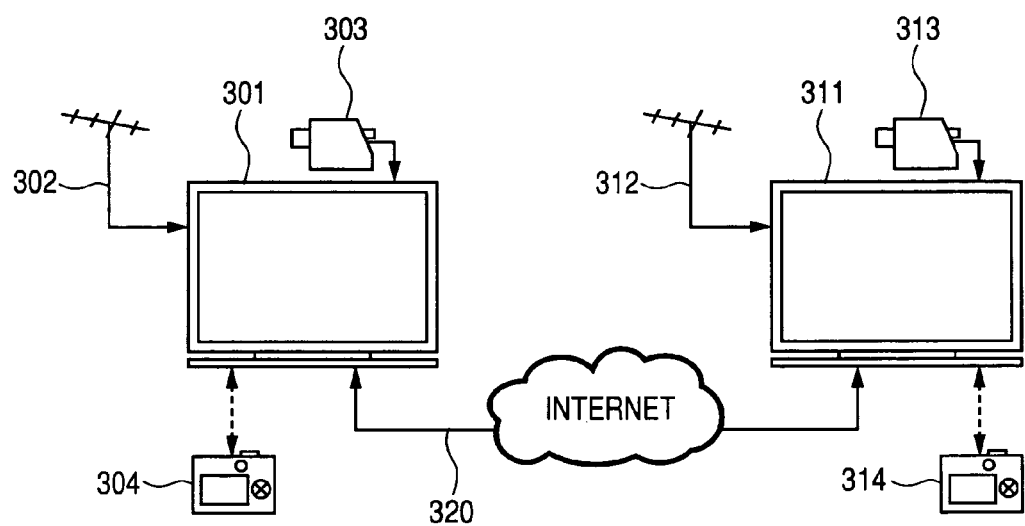
FIG. 6 is a constructional diagram of a whole system which is used in an image displaying method according to the embodiment 2 of the invention.

FIG. 6 is a constructional diagram of the whole system which is used in the image displaying method according to the embodiment 2 of the invention. In FIG. 6, reference numeral 301 denotes a digital television (1) for receiving a broadcast wave through an antenna 302 and viewing a television program. The digital television (1) 301 has a function for receiving photographed image data from a digital camera (1) 304 connected by wireless communicating means and displaying it. The digital television (1) 301 also has a function for transmitting video data showing a state of the user which is photographed by a digital video camera (1) 303 connected through a digital video interface and the photographed image data of the digital camera (1) 304 to a connected network (Internet) 320. The digital video camera (1) 303 is fixed onto the digital television (1) 301. The digital video camera(1) may be formed integrally within the digital television (1). Alternatively, the digital video camera (1) may be fixed on a periphery of the digital camera. A similar digital television (2) 311 is connected to the network 320. The similar digital television (2) 311 displays the received video data and image data. The digital television (2) 311 has a function for allowing the user to share the viewing of the photographed image of the digital camera (1) 304 together with the user of the digital television (1) 301.

The digital television (2) 311 has a construction similar to that of the digital television (1) 301. That is, the digital television (2) 311 has: a function for receiving a broadcast wave through an antenna 312 and allowing the user to view a television program; a function for receiving photographed image data of a digital camera (2) 314 connected in a wireless manner and allowing the user to view a television program; and a function for transmitting video data showing the state of the user which is photographed by a digital video camera (2) 313 connected through a digital video interface and the photographed image data of the digital camera (2) 314 to the network 320. The digital television (1) 301 has a function for displaying those received video data and image data and allowing the user to share the viewing of them together with the user of the digital television (2) 311.

Figure 7:
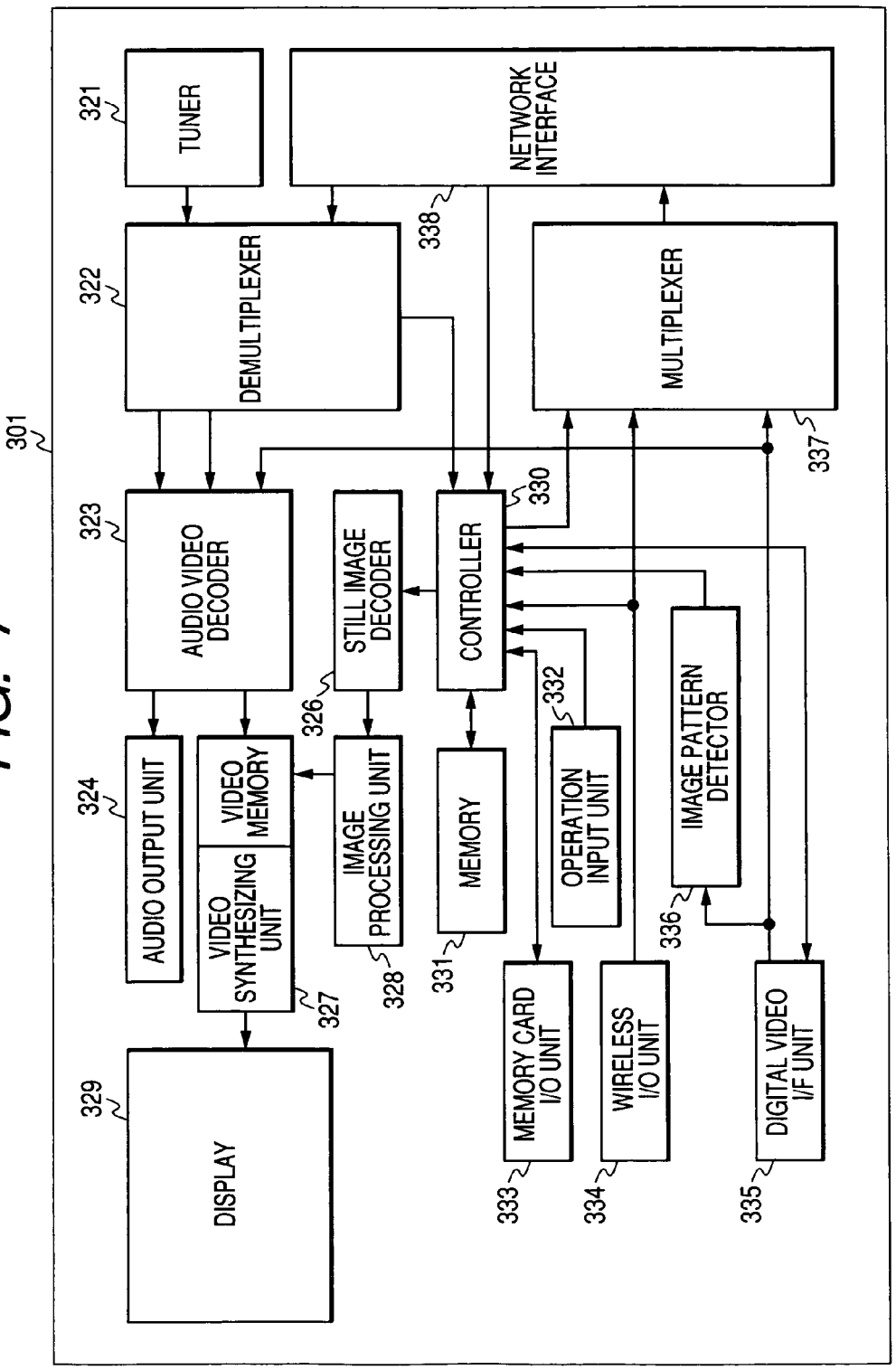
FIG. 7 is a block constructional diagram of a digital television which is used in the image displaying method according to the embodiment 2 of the invention.

FIG. 7 is a block constructional diagram of the digital television which is used in the image displaying method according to the embodiment 2 of the invention. In the diagram, reference numeral 321 denotes a tuner. A broadcast signal from a receiving antenna (antenna 302 shown in FIG. 10) of a digital broadcast and a broadcast signal of the CATV are inputted to the tuner 321. The tuner 321 selects a predetermined transmission channel from the reception signal on the basis of control of a controller 330, which will be explained hereinafter, executes demodulation, error correction, and the like to the reception data of the received transmission channel, and outputs a transport stream (TS) signal. Reference numeral 322 denotes a demultiplexer. The demultiplexer 322 extracts program layout information from the TS signal, outputs it to the controller 330, which will be explained hereinafter, and separates target video signal, audio signal, and digital broadcasted data from the TS signal in accordance with the control of the controller 330. The audio signal is decoded by an audio video decoder 323 and outputted as an audio sound from an audio output unit 324 including a D/A converter. The video signal is decoded by the audio video decoder 323, written into a video memory included in a video synthesizing unit 327, and thereafter, displayed onto a display 329 through the video synthesizing unit 327. As a device constructing the display 329, for example, there are a flat display panel having a matrix electrode structure such as a liquid crystal display or a plasma display, a CRT (cathode ray tube), or the like.

The separated digital broadcasted signal is stored into a memory 331 and it is read out again and outputted to the controller 330 when the user views the digital broadcast.

Reference numeral 332 denotes an operation input unit. The operation input unit 332 includes a receiving unit of a remote controller using an infrared signal and operation switches which are directly provided for the digital television (1) 301, inputs the operation of the user, and sends it to the controller 330. The operation input of the user which is received from the operation input unit 332, the program layout information which is received from the demultiplexer 322, or the digital broadcasted data read out from the memory 331 is inputted to the controller 330 and the controller 330 makes the following control. That is, on the basis of those input data, the controller 330 writes a graphic signal to be presented to the user into a video memory included in the video synthesizing unit 327, synthesizes the video signal from the audio video decoder 323 and a still image signal photographed by the digital camera, which will be explained hereinafter, by the video synthesizing unit 327, and allows the synthesized signal to be displayed onto the display 329. The digital television (1) 301 receives the digital broadcast on the basis of the operation of the user by the integrated control operation of the controller 330 in the foregoing component elements, thereby enabling the user to view a target broadcast program.

In the digital television (1) 301, reference numeral 333 denotes a memory card I/O unit. By connecting the memory card I/O unit 333 to a detachable memory card in which the image data photographed by the digital camera (1) 304, which will be explained hereinafter, has been stored, the memory card I/O unit 333 inputs and outputs image data including the photographed image data and additional information. The memory card I/O unit 333 stores the read-out data as an image file into the memory 331. The controller 330 outputs a display serving as a graphical user interface to the video memory on the basis of the program which has previously been stored, and allows it to be displayed on the display 329. Further, the controller 330 reads out the image data read out of the memory card or the image file stored in the memory 331 in accordance with the user operation which is inputted through the operation input unit 332 and sends the read-out data to a still image decoder 326. In the still image decoder 326, the compression-encoded image data is decoded, a reducing/enlarging process is executed to the decoded image data as necessary by an image processing unit 328, and thereafter, the processed data is synthesized with the graphic data for operation by the video synthesizing unit 327. The synthesized image is displayed on the display 329.

Reference numeral 334 denotes a wireless I/O unit 334. The wireless I/O unit 334 communicates with the wireless I/O unit 208 of the digital camera (2) 314, which will be explained hereinafter, and transmits the control data and the image file. The received photographed image file data of the digital camera is stored as an image file into the memory 331 in a manner similar to the image data inputted from the memory card I/O unit 333 and displayed onto the display 329 by processes similar to the signal processes. As means for wireless communication, a wireless LAN according to IEEE802.11b, a short range wireless method according to Bluetooth (registered trademark), or the like is used.

In the digital television (1) 301, by the integrated control operation of the controller 330 in the foregoing component elements, the image photographed by the digital camera can be viewed on the basis of the operation of the user.

Reference numeral 335 denotes a digital video interface (I/F) unit. By connecting the digital video I/F unit 335 to the digital video camera (1) 303, the I/F unit 335 makes communication for controlling the digital video camera (1) 303 and makes communication of the digital video data. The controller 330 allows an operation panel of the digital video camera (1) 303 by the graphic data which is presented to the user to be displayed on the display 329. The user can operate the digital video camera (1) 303 by operating graphic elements on the operation panel by the remote controller. That is, on the basis of the operation input of the user which is inputted through the operation input unit 332 in response to the display of the operation panel, the controller 330 forms a control command for the digital video camera (1) 303 and transmits it to the digital video camera (1) 303 through the digital video I/F unit 335. The digital video camera (1) 303 transmits in response to this command the video data recorded or the video data photographed by the video camera. The video data received through the digital video I/F unit 335 is sent to the audio video decoder and a video image and an audio sound are reproduced by the audio output unit 324 and the display 329.

As will be explained hereafter, position information comprising coordinate information and inclination information of the digital camera (1) 304 is included in the video data. A position information detector is constructed by the digital video camera (1) 303. A position information input unit is constructed by the digital video I/F unit 335.

For example, high-speed serial communication defined in IEEE1394 can be used to connect the digital video camera (1) 303. The digital video camera (1) 303 is controlled by a command set based on, for example, "AV/C Camera Subunit Specification" and "AV/C Tape Recorder/Player Subunit Specification" defined by "1394 Trade Association" and transfers a video signal in accordance with "IEC61883 Consumer audio/video equipment-Digital interface".

By the integrated control operation of the controller 330 in the foregoing component elements, the video image and the audio sound by the digital video camera can be viewed by the digital television (1) 301 on the basis of the operation of the user.

Figure 8:
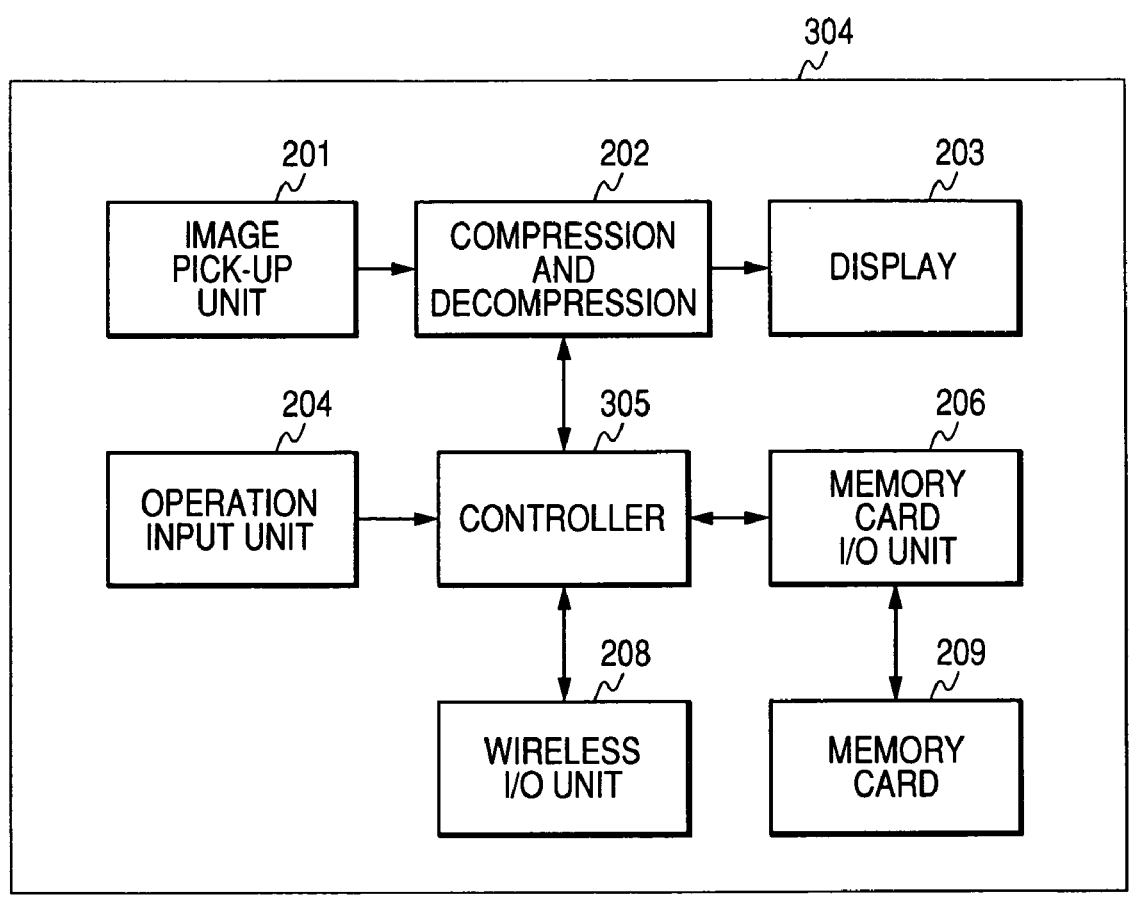
FIG. 8 is a block constructional diagram of a digital camera which is used in the image displaying method according to the embodiment 2 of the invention.

FIG. 8 is a block constructional diagram of a digital camera which is used in the image displaying method according to the embodiment 2 of the invention. The digital camera (1) 304 has a construction which is almost similar to that of the digital camera 200 in the embodiment 1 mentioned above and executes the similar operation. In FIG. 8, component elements which have substantially the same construction and execute substantially the same function (operation) as those of the digital camera 200 described in the embodiment 1 are designated by the same reference numerals and their description is omitted here. The digital camera (1) 304 differs from the digital camera 200 with respect to a point that it does not have the position detector. Therefore, a controller 305 differs from the controller 205 of the digital camera 200 in the embodiment 1 with respect to a point that the controller 305 does not have the control function of the position detector and communication regarding a position change of the digital camera (1) 304 is not made with the digital camera 304.

The digital television (1) 301 and the digital camera (1) 304 have been described above. The digital television (2) 311 has substantially the same construction as that of the digital television (1) 301 and executes the operation similar to that of the digital television (1) 301. The digital camera (2) 314 has substantially the same construction as that of the digital camera 304 and executes the operation similar to that of the digital camera 304. Therefore, their description is omitted here. In addition to the operation to view the broadcast program, the operation to view the image of the digital camera, and the operation to view the video image of the digital video camera, the digital television (1) 301 and the digital television (2) 311 can execute the operation for mutually connecting those televisions through a network, mutually showing the figures of the users of both of the televisions to the partner's digital television, and sharing the viewing of the images of the digital cameras. In the embodiment, such an operation is called a synchronous viewing operation.

Since the construction of the digital camera 304 is fundamentally the same as that of the digital camera 200 shown in FIG. 3 in the embodiment 1, the same component elements are designated by the same reference numerals and their description is omitted.

Figure 9:
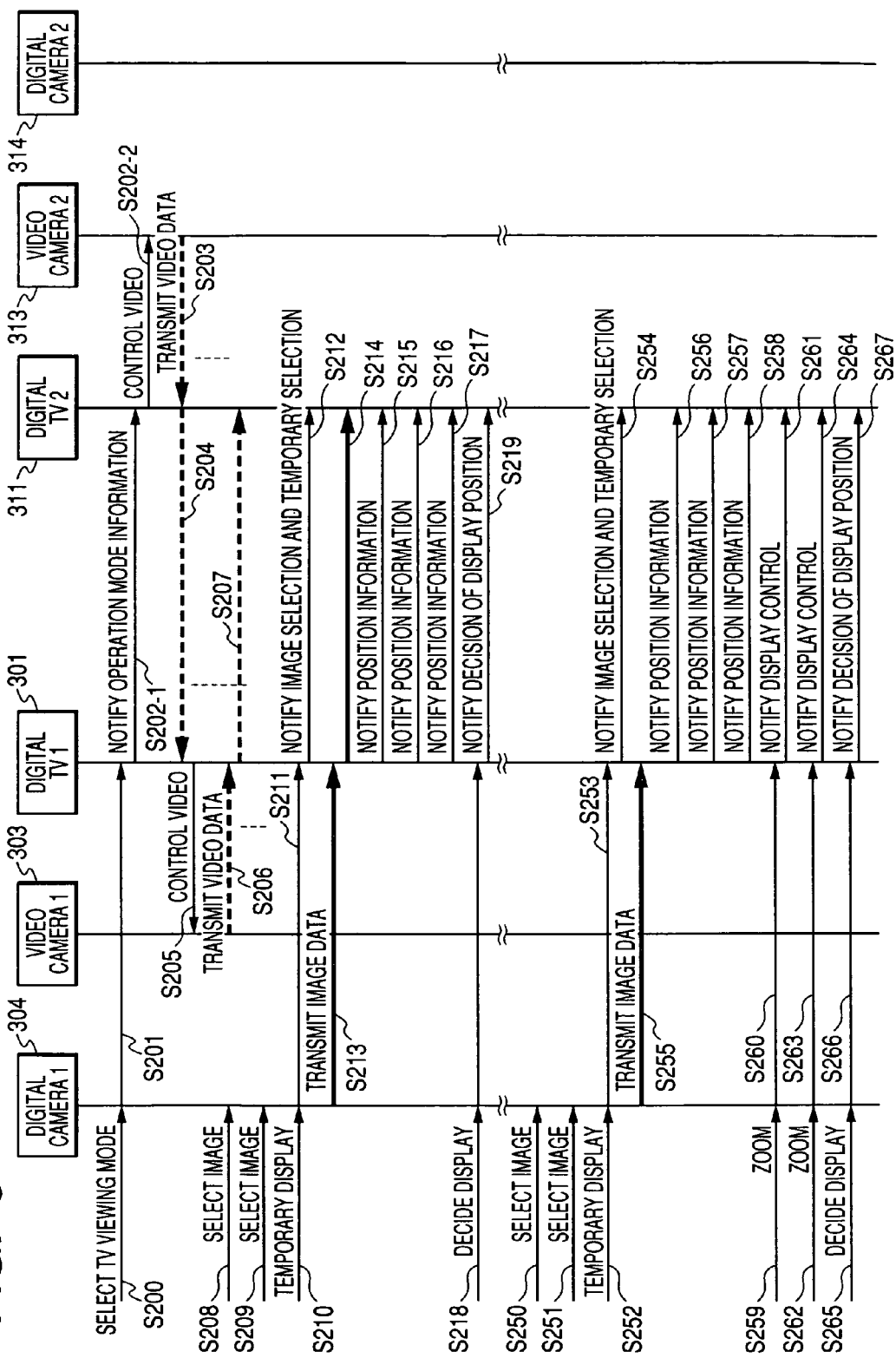
FIG. 9 is a flowchart showing a procedure of the image displaying method according to the embodiment 2 of the invention.

FIG. 9 is a flowchart showing a procedure of the image displaying method according to the embodiment 2 of the invention. According to this diagram, the synchronous viewing operation in the system of the embodiment will be explained with respect to a flow, as a center, of the control data, image data, and video data of the digital televisions (1) and (2), the digital cameras (1) and (2), and the digital video cameras (1) and (2).

The synchronous viewing operation of the digital television is started when the operation to switch the operating mode of the digital camera is executed. The user (1) of the digital television (1) 301 sets the switch 225 of the digital camera (1) 304 into the television viewing mode (S200). When the digital camera (1) 304 detects this mode, the digital camera (1) 304 notifies the digital television (1) 301 of it in a wireless manner (S201). In the digital television (1) 301, the controller 330 which received such a notification notifies the digital television (2) 311 of it as operating mode information through a network interface unit 338 via the network 320 (S202-1). In the digital television (2) 311 which received such a notification, a video control signal by a command is sent to the digital video camera (2) 313 through a digital video interface unit (S202-2), thereby allowing the digital video camera (2) 313 to output the photographed video signal (S203). The digital television (2) 311 which received the video signal transfers it to the digital television (1) 301 through the network 320. In the digital television (1) 301, the transferred video signal is received by the network I/F unit 338. The received video signal is sent to the audio video decoder through the demultiplexer and outputted by the audio output unit 324 and the display 329. That is, the video data obtained by photographing the state of the user (2) of the digital television (2) 311 is transmitted to the digital television (1) 301 and displayed.

In the digital television (1) 301, the display of the video image of the user (2) is started and the video control signal by the command is sent to the digital video camera (1) 303 through the digital video I/F (S205), thereby allowing the video signal photographed by the digital video camera (1) 303 to be outputted (S206). The digital television (1) 301 which received it transfers the video signal to the digital television (2) 311 through the network 320 (S207). In the digital television (2) 311, the video image is outputted by the operation similar to that of the digital television (1) 301. That is, the video data obtained by photographing the state of the user (1) of the digital television (1) 301 is transmitted to the digital television (2) 311 and displayed. In this manner, the users (1) and (2) can start a situation like what is called a videoconference in which they have a conversation while looking at the video images of their figures by the digital television (1) 301 and the digital television (2) 311.

The user (1) selects the image to be viewed by using the liquid crystal monitor of the digital camera (1) 304 at hand. That is, by operating the right/left direction buttons 227 of the digital camera (1) 304, the images which are displayed on the liquid crystal monitor are sequentially changed (S208, S209). When the user (1) finds the image to be displayed, he directs the digital camera (1) 304 toward the digital television (1) 301 and depresses the shutter button 222 of the digital camera (1) 304 to the half position. In the digital camera (1) 304, the digital television (1) 301 is notified of the detected operation (S211) and the image data of the corresponding image is transmitted to the digital television (1) 301 in a wireless manner (S213). In the digital television (1) 301, the digital television (2) 311 is notified of the information regarding the temporarily-selected image through the network (S212) and the received image data is transmitted to the digital television (2) 311 (S214). In the digital television (2) 311, the image data received in the network I/F unit 338 is temporarily stored into the memory 331.

In the digital television (1) 301 which received the notification of the temporary selection from the digital camera (1) 304, the temporary selecting and transmitting operations are executed under the control of the controller 330. That is, the position of the digital camera (1) 304 (position to the digital television (1) 301) is detected from the video data which is inputted from the digital video camera (1) 303 and notified as coordinate information and inclination information to the digital television (2) 311.

The function for extracting the coordinate information and the inclination information of the digital camera (1) 304 from the video data including the position information is executed in an image pattern detector 336 of the digital television (1) 301. The image pattern detector 336 decodes the digital video data which is received by the digital video I/F unit 335, detects a pre-registered image pattern showing an external view of the digital camera (1) 304 from the video image of each frame, and notifies the controller 330 of the detected image pattern as coordinate information and inclination information in the frame plane. The controller 330 transmits the image pattern as a position information notification to the digital television (2) 311 through the network I/F unit 338 in consideration of another operation input. The position information mentioned here denotes information including the coordinate information and the inclination information.

In the digital television (2) 311 which received the notification of the temporary selection, the temporary selecting and receiving operations are executed under the control of the controller 330. That is, the image data received from the digital television (1) 301 is multiplexed to the video data which is received from the digital television (1) 301 on the basis of the position information notification that is continuously received and the resultant video data is displayed.

In the temporary selecting and receiving operations, the controller 330 of the digital television (2) 311 sends the image data which has been received through the network and stored in the memory 331 to the still image decoder 326 and develops the compression-encoded image. The non-compression image data sent to the image processing unit 328 is subjected to an enlarging or reducing process in accordance with the zoom setting based on a display control notification, which will be explained hereinafter, and the processed image data is written into the video memory in the video synthesizing unit 327. In the video synthesizing unit 327, the image data is synthesized to the intraframe position of the video data designated by the notified position information and the obtained data is outputted to the display 329. In the display 329, the photographed image selected in the digital camera (1) 304 by the user (1) is synthesized and displayed in the position of the image of the digital camera (1) 304 shown in the video data.

Subsequently, when the selected image reaches a desired position, the user (1) fully depresses the shutter button 222 of the digital camera (1) 304, thereby deciding the display position of the image. That is, the digital television (1) 301 is notified of the full-depressing operation (S218) of the shutter button 222 in a wireless manner. The digital television (1) 301 transmits it as a display position decision notification to the digital television (2) 311 through the network. In the digital television (2) 311, on the basis of the display position decision notification received by the network I/F unit 338, the controller 330 controls the video synthesizing unit 327 so that the synthesizing position of the image data to the video data is fixed to the present position. After that, even if the position of the digital camera (1) 304 shown in the video data changes, the position of the image to be synthesized does not follow the changed position. In the display 329, the image is displayed in the fixed position and a video image obtained by photographing the figure of the user (1) is displayed behind it.

Figure 10:
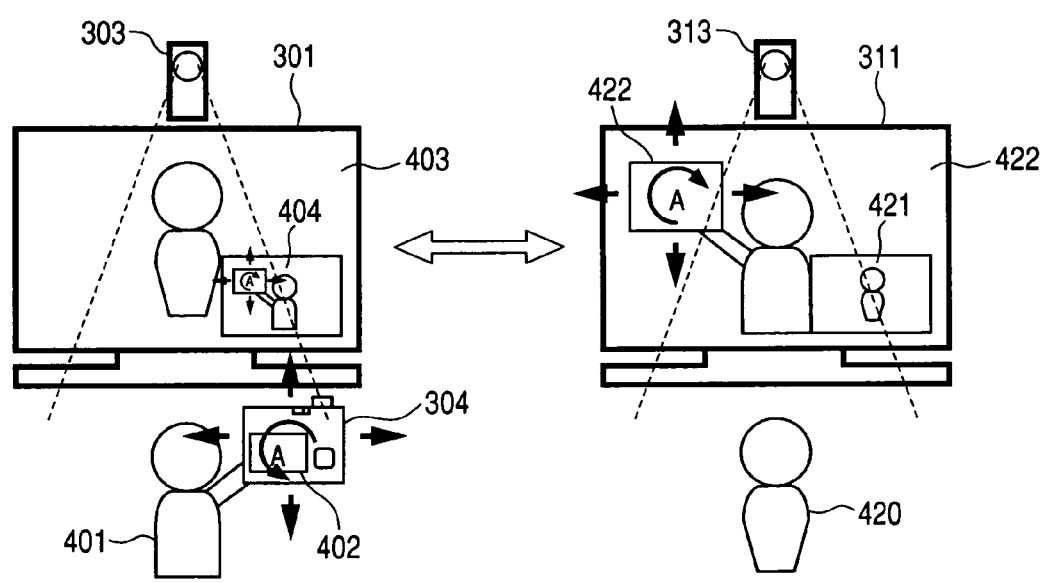
FIG. 10 is a schematic diagram showing an example of the state where images are displayed by the image displaying method according to the embodiment 2 of the invention.
Figure 11A:
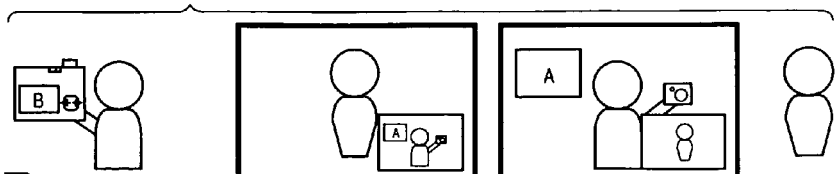
FIGS. 11A, 11B, 11C, 11D, 11E, 11F and 11G are schematic diagrams showing an example of the state where images are displayed by the image displaying method according to the embodiment 2 of the invention.
Figure 11B:
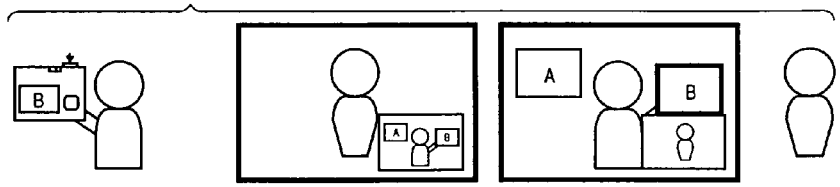
Figure 11C:
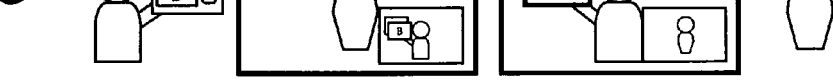
Figure 11D:
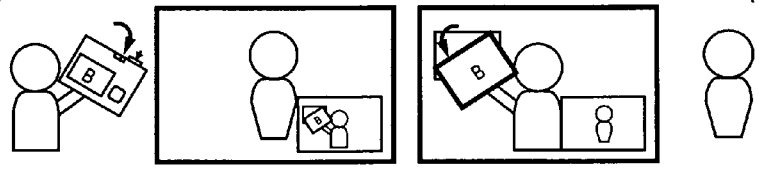
Figure 11E:
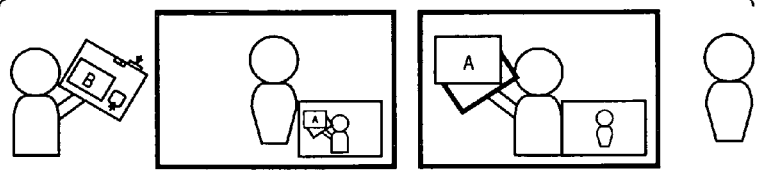
Figure 11F:
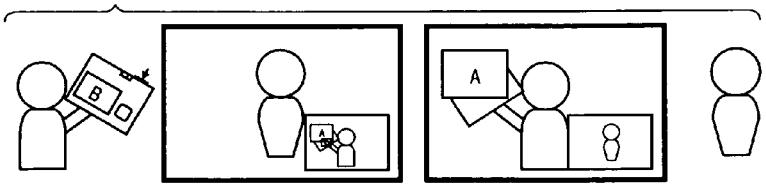
Figure 11G:
Figure 12:
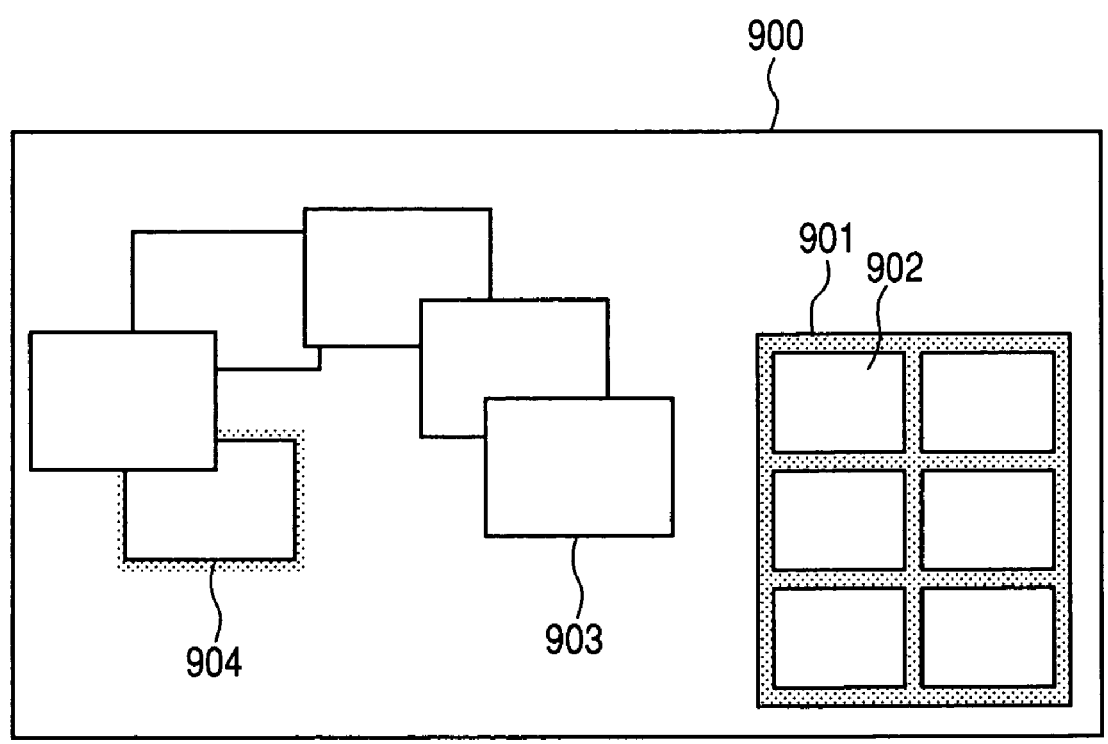
FIG. 12 shows an example of a layout displayed by an image displaying method according to the prior art.

FIGS. 10 and 11A to 11G are schematic diagrams showing an example of the state where images are displayed by the image displaying method according to the embodiment 2 of the invention. That is, FIGS. 10 to 11G schematically show the operation of the user and the state of the digital television in the foregoing operation. FIG. 10 shows a relation between the display layouts in the digital television (1) 301 and the digital television (2) 311 and the display position of the image data on the digital television (2) 311 to the motion of the digital camera (1) 304. In the diagrams, reference numeral 401 denotes a user (1) and the state where the user (l) grasps the digital camera (1) 304 at the right hand and looks at the display on the digital television (1) 301 is photographed by the digital video camera (1) 303. Although not shown, the shutter button of the digital camera (1) 304 is in the half-depressed state. An image (A) selected by the user (1) 401 is displayed on a liquid crystal monitor 402 of the digital camera (1) 304. A state (403) of a partner user is displayed on the display of the digital television (1) 301. A state of the user (1) 401 himself which is displayed on the partner digital television is displayed as a monitor onto a child display screen 404.

Reference numeral 420 denotes a user (2) and the state where he looks at the display on the digital television (2) 311 is photographed by the digital video camera 313. A state (422) of the user (1) as a partner user is displayed on the display of the digital television (2) 311. A state of the user (2) 420 himself which is displayed on the partner digital television is displayed as a monitor onto a child display screen 421. In the state (422) of the partner user, an image (A) 422 selected by the user (1) 401 by using the digital camera (1) 304 is displayed in the position of the digital camera (1) 304 grasped by the user (1) at the right hand.

Now, the digital camera (1) 304 grasped by the user (1) 401 at the right hand is moved upward or to the right in a plane which is almost parallel with the display surface of the digital television (1) 301. Since the position of the digital camera (1) 304 in the video image which is photographed by the digital video camera 303 is moved upward or to the left, the position of the image (A) 422 which is displayed on the digital television (2) 311 is moved upward or to the left in the display surface. That is, the state of the user (1) 401 which is synthesized and displayed on the digital television (2) 311 is displayed as if the user grasped the selected image (A) in place of the digital camera (1) 304 and such a state was shown to the user (2) 420. This is true of the case where the digital camera (1) 304 is rotated in the plane which is almost parallel with the display surface of the digital television (1) 301. Since such a state is displayed on the child display screen 404 of the digital television (1) 301, the user (1) can operate the digital camera (1) 304 while confirming an effect of the synthesized video display screen.

FIGS. 11A to 11G are diagrams schematically showing the state of the user until the user (1) 401 selects an image (B) in the digital camera (1) 304, adjusts the display position in the temporary selecting state, and decides the display position and the display state of the digital television. The leftmost column of each diagram schematically shows the state where the figure of the user (1) who faces the digital television (1) 301 and is photographed by the digital video camera (1) 303 is seen from the back side. The second column schematically shows the state of the display of the digital television (1) 301. The third column schematically shows the state of the display of the digital television (2) 311. The rightmost column schematically shows the state where the figure of the user (2) 420 who faces the digital television (2) 311 and is photographed by the digital video camera (2) 313 is seen from the back side.

In FIG. 11A, the user (1) 401 selects the image (B) serving as a display target on the liquid crystal monitor by the right/left buttons of the digital camera (1) 304. The image (A) displayed by the previous operation is displayed on the display of the digital television (2) 311 for displaying such a state and the image of the digital camera (1) 304 is displayed. In the digital television (2) 311, by the half-depression of the shutter button by the user (1) 401, the selected image (B in the diagram) can be displayed in the position of the digital camera (1) 304 (FIG. 11B). By moving the digital camera (1) 304 by the user (1), the display position of the selected image can be moved (FIG. 11C). The displaying direction of the image (B) can be rotated by rotating the digital camera (1) 304 (FIG. 11D). By another operation input of the digital camera (1) 304, an overlap relation with another image (A) displayed on the digital television (2) 311 can be controlled so that the image (B) is displayed behind the image (A) by a larger area (FIG. 11E). The display state can be determined by fully depressing the shutter button (FIG. 11F). In FIG. 11F, the image of the digital camera (1) 304 which is displayed on the digital television (2) 311 is hidden on the back side of the image (B). However, since the display position of the image (B) has been fixed at a point of time when the display state is determined, by moving the digital camera (1) 304, its image appears on the display of the digital television (2) 311 (FIG. 11G).

With respect to the image (B in the diagram) which has been selected and has become the target of the position adjustment in the diagrams, the periphery of the displayed image is colored so as to indicate the operation target. Such a focusing indication is finished when the display state is determined (FIG. 11F). In FIG. 11E, the operation to change the overlap relation with another image (A) so that the image (B) is displayed behind the image (A) by the larger area is shown. However, it is also possible to change so that the target image is overlapped over another image by a similar operation input in the digital camera (1) 304.

Returning to FIG. 9, the operation in the case where the image which has already been displayed on the digital television (2) 311 is selected in the digital camera (1) 304 will be described. In the diagram, the image is selected on the liquid crystal monitor of the digital camera by the operation input of the user (S250 to S252). The digital television (1) 301 is notified of the selected image from the digital camera (1) 304 in a wireless manner (S253). At this time, if the designated image is an image in which the designation for displaying has already been notified in the digital television (2) 311, the digital television (1) 301 transmits designation information of the selected image and the temporary-selecting operation to the digital television (2) 311 through the network (S254) However, the image data received from the digital camera (1) 304 together with such a notification is not transmitted to the digital television (2) 311. In the digital television (2) 311 which received the image selection and temporary selection notification, the image which has already been displayed in the control of the controller 330 is used as a target of the display position control and the designated image is moved to the position according to the notified position information from the position which has already been determined and is displayed.

In the temporary selection display state where the display position of the image is moved in accordance with the position of the digital camera, when the user operates the zoom buttons 223 of the digital camera (1) 304 (S259), the digital camera (1) 304 notifies the digital television (1) 301 of the zooming operation in a wireless manner (S260). The digital television (1) 301 notifies the digital television (2) 311 of the zooming operation as display control information through the network (S261). In the digital television (2) 311, the image processing unit 328 is controlled under the control of the controller 330 so as to form the enlarged or reduced image of the image to be displayed, and the enlarged or reduced image is displayed on the display 329 through the video synthesizing unit 327. At this time, the controller 305 of the digital camera (1) 304 allows a similar enlarged or reduced image to be also displayed on the liquid crystal monitor.

When the user operates the direction buttons 227 during the enlarging/reducing operation (S262), the digital television (2) 311 is notified of the display control information along a similar path (S263, S264). In the digital television (2) 311, the center position of the enlargement/reduction display is adjusted in the video synthesizing unit 327 under the control of the controller 330 and the display area of the image to be displayed on the display 329 is changed. Such a display state is determined when the user fully depresses the shutter button 222 of the digital camera (1) 304 (S265) and the image synthesizing position on the display 329 in the digital television (2) 311 is fixed (S266, S267) as already described above.

As described above, according to the system of the embodiment, in the digital television system in which the digital video cameras are connected through the network, the video images obtained by photographing the figures of the users are mutually communicated through the network and displayed, and the communication by the video images is realized, the system has: the step wherein the relative position of the digital camera grasped by the user to be photographed in front of one of the digital televisions is detected in the video data, the user selects the image serving as a display target from a plurality of photographed images stored in the digital camera, and in the other digital television, the selected image data is synthesized to the position according to the relative position detected in the video data, and the synthesized image is displayed; and the step wherein another image data selected by the digital camera is synthesized to another detected relative position and the synthesized image is displayed. Thus, when the user selects the image serving as a display target on the display screen of the other digital television, the selecting operation on the display screen becomes unnecessary. Therefore, even in the operation environment where a plane space such as a desk or the like does not exist in a living room or the like where the digital television is preferably disposed in a home and the input device such as mouse, pen input, or the like which designates the position in the display plane cannot be used, the simple operation can be realized and the more smooth video communication can be realized.

By directly moving the digital camera main body in which the image data has been selected and displayed on the liquid crystal monitor, the image position on the synthesized display can be moved. Therefore, the operation which is executed as if the target photograph card were moved to the top from a bundle of a plurality of photograph cards held in the palm of the user's hand and the bundle of photograph cards could be directly moved and put in the desired display position can be realized. In this manner, the inspirational operation which can be easily understood according to actual simulation can be executed.

The embodiments have been described above on the assumption that the image data stored in the memory card of the digital camera is transmitted through the network each time the image selecting operation is executed. Such a construction is used by presuming a situation in which a total data amount of the image data stored in the memory card is large and is not suitable to transfer all of the image data. However, in the case where an amount of data which is transferred is proper with respect to a transfer speed of the network, it is also possible to use a construction in which the image data stored in the memory card is transferred in a lump to the other digital television at the start of the operation and only the selection information is notified when the image is selected on the digital camera.

In the construction which presumes the batch transfer of the image data as a prerequisite, the image data is not always limited to the transfer through the network but it is also possible to construct the system in such a manner that a removable media such as a memory card or the like in which a plurality of image data serving as display targets has been stored is sent to the other user prior to starting the operation and connected to the other digital television.

A method of using infrared rays can be also used for the wireless communication between the digital camera and the digital television. However, since it takes time to transfer the image data, if such a method is used together with means for preliminarily transferring the image data, means for preliminarily moving the image data by the memory card, or the like, it is more effective. The essence of the present invention is not lost even by the communication using the wired connection so long as it lies within the scope of the range where the movement of the digital camera is not obstructed.

Although the foregoing embodiments have been shown with respect to the example in which the still images accumulated in the digital camera are displayed on the display screen of the display, motion images can be also used as images.

The invention is not limited to the foregoing embodiments but incorporates a computer-executable program having program codes which are executed by a digital television or a set-top box (computer). Therefore, it is also possible to use a construction in which the digital television or the set-top box (computer) which does not have the functions described in the embodiments 1 and 2 is prepared, a program for executing the methods described in the embodiments 1 and 2 is downloaded, and the digital television or the set-top box executes the methods described in the embodiments 1 and 2.

This application claims priorities from Japanese Patent Application Nos. 2004-106273, filed on Mar. 31, 2004, and 2005-048840, filed on. Feb. 24, 2005, which are hereby incorporated by reference herein.

What is claimed is:

1. A display system comprising a display apparatus and a digital camera,
   the digital camera comprising:
      a storing unit for storing a plurality of still images;
      an operating unit for selecting a still image from among the plurality of still images stored in the storing unit in accordance with a selection instruction from a user; and
      a transmitting unit for transmitting, to the display apparatus, (a) the plurality of still images stored in the storing unit: (b) selecting information indicating the still image selected by the operating unit from the plurality of still images stored in the storing unit, and (c) position information in accordance with a position of the digital camera being changed by a user, with the position of the digital camera being detected by an acceleration sensor;
   the display apparatus comprising:
      a receiving unit for receiving, from the digital camera, the plurality of still images stored in the storing unit, the position information of the digital camera and the selecting information indicating the still image selected from the plurality of still images stored in the storing unit; and
      a display controlling unit for controlling display of the still image selected from the plurality of still images received by the receiving unit on a partial area of a display screen based on the selecting information received by the receiving unit,
   wherein the display controlling unit controls movement of a layout position of the selected still image being displayed on the partial area of the display screen in accordance with movement of the digital camera dynamically at the same time as indicated by the position information thereof received by the receiving unit.

2. A system according to claim 1, wherein in a state where the still image is displayed in the partial area, the display controlling unit displays another still image, which has been newly selected from the plurality of still images stored in the storing unit of the digital camera on another partial area on the display, and controls movement of the layout position of the another newly selected still image being displayed on the another partial area of the display screen in accordance with movement of the digital camera indicated by the position information transmitted by the transmitting unit of the digital camera.

3. A system according to claim 2, wherein when there is an area where the partial area in which the still image is displayed and the another area in which the another still image is displayed overlap, with respect to the overlap area, the display controlling unit controls display of the still image and the another still image so that only one of those still images is displayed on the basis of the position information transmitted by the transmitting unit of the digital camera.

* * * * *